(12) United States Patent
Kumar et al.

(10) Patent No.: US 10,397,777 B2
(45) Date of Patent: Aug. 27, 2019

(54) METHOD AND SYSTEM TO PROVIDE MULTI-FACTOR AUTHENTICATION FOR NETWORK ACCESS USING LIGHT

(71) Applicant: Cisco Technology, Inc., San Jose, CA (US)

(72) Inventors: Ashwin Kumar, Bangalore (IN); Sarat Pollakattu, Karnataka (IN); John D. Parello, Campbell, CA (US); Padmanabhan Ramanujam, Karnataka (IN)

(73) Assignee: Cisco Technology, Inc., San Jose, CA (US)

( * ) Notice: Subject to any disclaimer, the term of this patent is extended or adjusted under 35 U.S.C. 154(b) by 203 days.

(21) Appl. No.: 15/142,061

(22) Filed: Apr. 29, 2016

(65) Prior Publication Data
US 2017/0318460 A1    Nov. 2, 2017

(51) Int. Cl.
*H04L 29/06* (2006.01)
*H04W 12/06* (2009.01)
(Continued)

(52) U.S. Cl.
CPC .......... *H04W 12/06* (2013.01); *H04B 10/116* (2013.01); *H04L 9/302* (2013.01);
(Continued)

(58) Field of Classification Search
CPC .... H04W 12/06; H04W 84/12; H04B 10/116; H04L 9/302; H04L 9/3249; H04L 9/3252; H04L 63/06; H04L 63/083
See application file for complete search history.

(56) References Cited

U.S. PATENT DOCUMENTS

| | | | | |
|---|---|---|---|---|
| 8,631,475 B1 * | 1/2014 | O'Malley | ............... | H04L 63/12 726/5 |
| 8,922,342 B1 * | 12/2014 | Ashenfelter | ....... | G07C 9/00087 340/5.82 |

(Continued)

FOREIGN PATENT DOCUMENTS

| WO | 2016/034573 A1 | 3/2016 |
|---|---|---|
| WO | 2016/038353 A1 | 3/2016 |

OTHER PUBLICATIONS

"Shedding Light on Li-Fi", available at: http://purelifi.com/news_media/lifi-white-papers/, downloaded from the Internet on Apr. 29, 2016, 3 pages.

(Continued)

*Primary Examiner* — Sarah Su
(74) *Attorney, Agent, or Firm* — Edell, Shapiro & Finnan, LLC

(57) ABSTRACT

A method is provided in which a network access system receives an initial request from a device requesting access to the network. In response to successfully authenticating the initial access request, the system causes a code to be transmitted in light emitted by one or more light fixtures within a physical space in which access to the network is to be restricted. The system receives information from the device requesting access to the network and determines whether to permit the device access to the network based on the initial request and on whether the received information is derived from the code transmitted by the one or more light fixtures, thereby indicating that the requesting device is within the physical space.

20 Claims, 7 Drawing Sheets

(51) Int. Cl.
*H04L 9/30* (2006.01)
*H04L 9/32* (2006.01)
*H04B 10/116* (2013.01)

(52) U.S. Cl.
CPC .......... *H04L 9/3249* (2013.01); *H04L 9/3252* (2013.01); *H04L 63/083* (2013.01); *H04L 2463/082* (2013.01)

(56) References Cited

U.S. PATENT DOCUMENTS

| | | | |
|---|---|---|---|
| 9,143,402 B2 | 9/2015 | Tinnakornsrisuphap et al. | |
| 9,270,627 B1 | 2/2016 | Koo | |
| 9,425,869 B1* | 8/2016 | Niewczas | H04W 52/18 |
| 9,467,293 B1* | 10/2016 | Brainard | G06Q 20/3823 |
| 9,652,770 B1* | 5/2017 | Kurani | G06Q 20/385 |
| 2006/0205354 A1* | 9/2006 | Pirzada | H04L 63/0492 455/66.1 |
| 2007/0198848 A1* | 8/2007 | Bjorn | G06F 21/35 713/186 |
| 2014/0255036 A1* | 9/2014 | Jovicic | H04B 10/116 398/115 |
| 2015/0358079 A1 | 2/2015 | Cronin | |
| 2015/0076989 A1* | 3/2015 | Walma | H04B 10/40 315/149 |
| 2015/0319730 A1* | 11/2015 | Seine | H04W 64/003 370/338 |
| 2016/0073271 A1 | 3/2016 | Schultz et al. | |
| 2016/0352751 A1* | 12/2016 | Perrufel | H04L 63/0876 |
| 2017/0026787 A1* | 1/2017 | Chow | H04W 4/021 |
| 2017/0103647 A1* | 4/2017 | Davis | G06F 1/3287 |
| 2017/0139033 A1* | 5/2017 | Lydecker | G01S 5/16 |
| 2017/0178431 A1* | 6/2017 | Ashenfelter | G07C 9/00087 |
| 2017/0206721 A1* | 7/2017 | Koo | G07C 9/00015 |
| 2017/0347006 A1* | 11/2017 | Ryan | H04N 5/3532 |
| 2018/0041896 A1* | 2/2018 | Ji | H04W 12/06 |
| 2018/0234181 A1* | 8/2018 | Nyarko | H04B 10/116 |

OTHER PUBLICATIONS

"RSA SecurID Risk-Based Authentication", Data Sheet, H13823, www.emc.com/rsa, Dec. 2014, 2 pages.

"RSA SecurID Software Tokens", Data Sheet, H13819, www.emc.com/rsa, Dec. 2014, 1 page.

* cited by examiner

METHOD AND SYSTEM TO PROVIDE MULTI-FACTOR AUTHENTICATION FOR NETWORK ACCESS USING LIGHT

TECHNICAL FIELD

The present disclosure relates to transmitting codes over light to provide multi-factor authentication in a computer networking system.

BACKGROUND

Certain situations require users to be in a specific physical location before they have access to a network and any of the resources on the network. With a wired network, it is relatively easy to identify the physical location of a user's device. With other transport mediums (such as wireless local area networks (e.g., Wi-Fi® networks), wireless wide area networks (e.g., 4G or LTE), short-range wireless networks (e.g., Bluetooth® networks, etc.) it is more challenging to verify the physical presence of the user.

DESCRIPTION OF EXAMPLE EMBODIMENTS

In accordance with one embodiment, a method is disclosed in which a network access system receives an initial request from a device requesting access to a network. In response to successfully authenticating the initial access request, a code is caused to be transmitted in light emitted by one or more light fixtures within a physical space in which access to the network is to be restricted. Information is received from the device requesting access to the network and it is determined whether to permit the device access to the network based on the initial request and on whether the received information is derived from the code transmitted by the one or more light fixtures, indicating that the requesting device is within the physical space. Thus, the detection of the code contained in the light is used to confirm physical presence of a device within a certain space region and to condition whether to grant the device (wired or wireless) access to a network (and the resources on the network).

Example Embodiments

Figure 1:
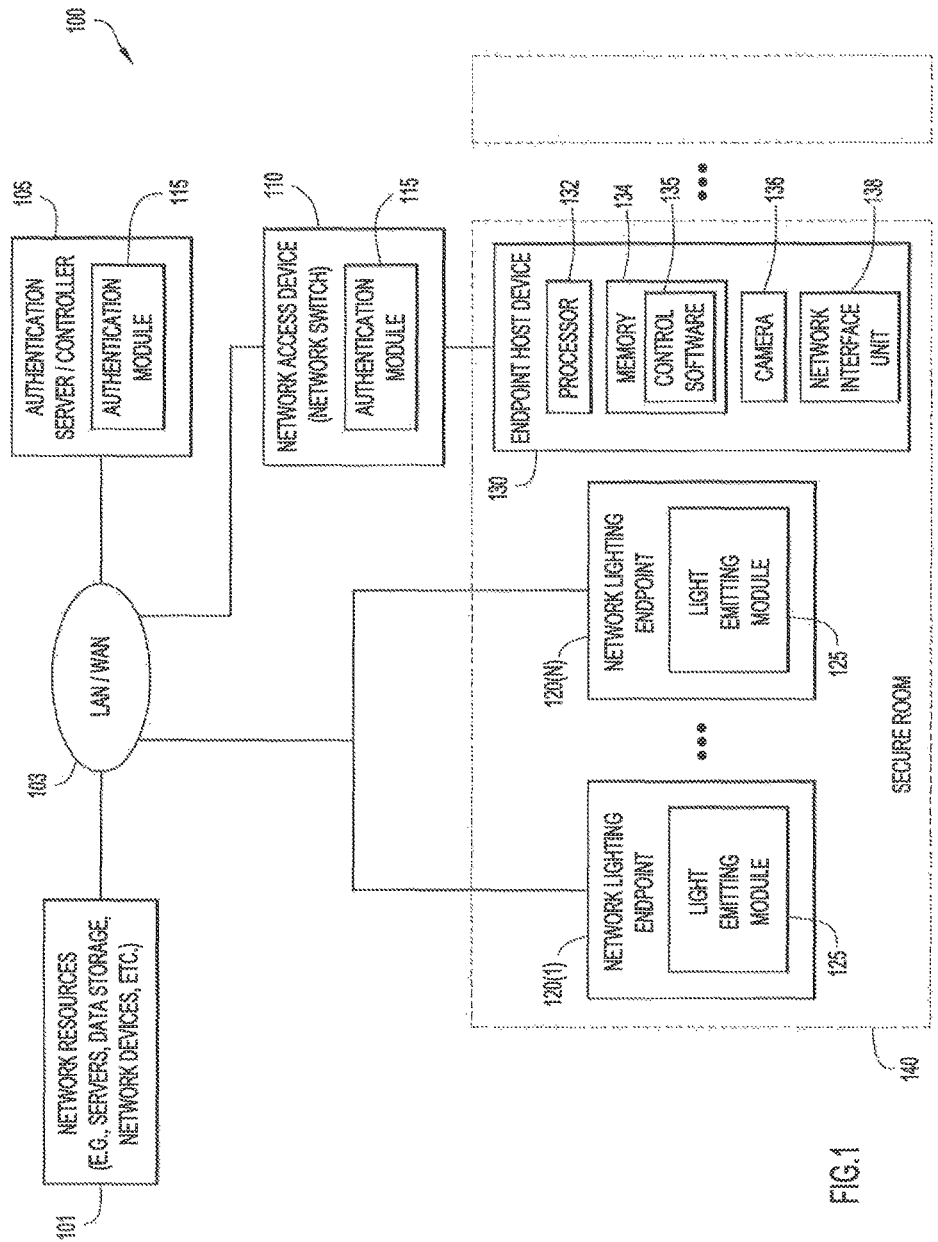
FIG. 1 is a block diagram of a network access environment in which multi-factor authentication, including codes transmitted by light, is employed to control network access, according to an example embodiment.

With reference first to FIG. 1, there is depicted a block diagram of a network access environment 100 in which a multi-factor authentication process, including light, may be implemented to control access to network resources 101 on the network 100. Network access environment 100 includes an authentication server/controller 105, a network access device 110 and network lighting endpoints 120(1)-120(N), which are in communication with an authentication server/controller 105 over a network 103. The network lighting endpoints 120(1)-120N) are configured to transmit light that contains codes to be detected by an endpoint host device 130 only if the endpoint host device 130 is located within a particular physical space, referred to as a "secure room" 140. Network 103 may include one or more wide area networks (WANs), such as the Internet, and one or more local area networks (LANs). The network access device 110 may be a wireless access point, or a wired network device, e.g., gateway, router, switch, etc., deployed to coordinate the reception and transmission of signals between endpoint host device 130 and authentication server/controller 105, and enable communication between the network resources 101 and the endpoint device 130. The network access device 110 may operate in accordance with any communication/network technology, including, but not limited to, Ethernet, Wi-Fi®, Bluetooth®, 4G or LTE, etc.

Each lighting endpoint 120(1)-120(N) may be any light fixture or light-emitting device now known, or hereafter developed, and may include one or more light emitting modules 125. Endpoint host device 130 may be a wired or wireless communication device equipped with a camera 136, or more generally a light sensor. For example, endpoint host device 130 may be a laptop, tablet, smartphone, etc. Authentication server/controller 105 and/or network access device 110 may include authentication module 115 that includes logic to authenticate information received from endpoint host device 130.

It is to be understood that there may be multiple secure rooms, as indicated in FIG. 1, each having one or more network lighting endpoints therein, to enable the multi-factor authentication techniques in each of several dedicated secure rooms.

Generally, network lighting endpoints 120(1)-120(N) transmit secure codes to endpoint host device 130, via light within secure room 140. Endpoint device 130 may use camera 136 to capture the emitted light within secure room 140. According to an embodiment, authentication module 115 may generate the secure codes that are transmitted by network lighting endpoints 120(1)-120(N). Network access device 110 receives information from host device 130, and forwards that information to authentication server/controller 105 to authenticate endpoint host device 130 prior to granting host device 130 access to network resources 101.

The endpoint device 130 of FIG. 1 is now described in more detail. Endpoint device 130 includes one or more processors 132, a memory 134 that stores control software 135, a camera 136 and a network interface unit 138. The one or more processors 132 may be a microprocessor or a microcontroller. Network interface unit 138 enables network communication, such as wired or wireless network communication, e.g., to wirelessly communicate with network access device 110. Memory 134 may include read only memory (ROM), random access memory (RAM), magnetic disk storage media devices, optical storage media devices, flash memory devices, electrical, optical, or other physical/tangible memory storage devices. Processor 132 executes instructions for the control software 135 stored in memory 134. For example, processor 132 may execute instructions of control software 135 to control the operation of endpoint device 130, including, but not limited to, causing camera 136 to capture light emitted by one or more network lighting endpoints 120(1)-120(N) and to extract/capture the code contained in the emitted light. As is known in the art, many smartphone devices include a camera that enables the device to capture light emitted by a light fixture.

Thus, in general, memory 134 may include one or more tangible (non-transitory) computer readable storage media (e.g., a memory device) encoded with software comprising computer executable instructions and, when the software is executed (by processor 132), it is operable to perform the operations of endpoint host device 130 described herein.

Figure 2:
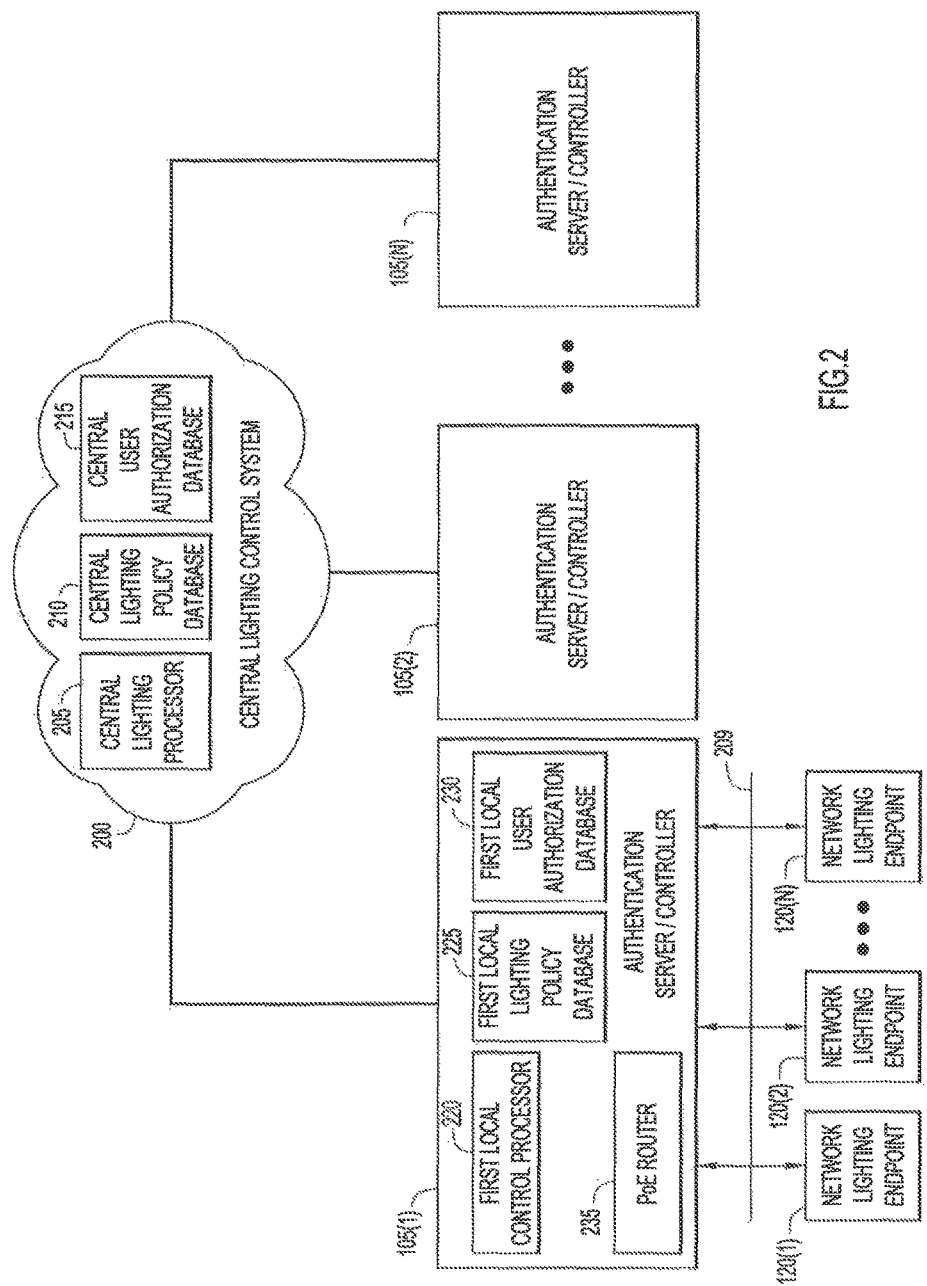
FIG. 2 is a block diagram of a lighting control system, according to an example embodiment.

Referring now to FIG. 2, a block diagram of a lighting control system is shown that may be used in connection with the network access system shown in FIG. 1, according to an example embodiment. As shown in FIG. 2, the lighting control system includes a central lighting control system 200 and one or more instances of an authentication server/controller 105(1)-105(N). The central lighting control system 200 includes a central lighting processor 205, a central lighting policy database 210, and a central user authorization database 215.

Each authentication server/controller 105(1)-105(N) includes a first local control processor 220, a first local lighting policy database 225, a first local user authorization database 230, and a first Power over Ethernet (PoE) Router 235. The plurality of network lighting endpoints 120(1)-120(N) are in communication with a corresponding one of the authentication server/controllers 105(1)-105(N).

In accordance with an example embodiment, Ethernet commands may be routed to a Power over Ethernet (PoE) router, such as PoE routers 235 shown in FIG. 2, that drive network lighting endpoints 120(1)-120(N). Network lighting endpoints 120(1)-120(N) may be incandescent, florescent, or light emitting diode (LED) troffers mounted in the ceiling, track lights, floor lamps, task lights, or other types of fixtures. PoE router 235 may supply both energy and communication network functions over communication network 209 to network lighting endpoints 120(1)-120(N), using a hub and spoke star topology. Commands packets generated by a authentication server/controller 105(1)-105(N) may be transmitted to one or more of the lighting endpoints 120(1)-120(N) to control the code emitted by one or more of lighting endpoints 120(1)-120(N), and thereby enable the multi-factor authentication techniques described herein.

Figure 3:
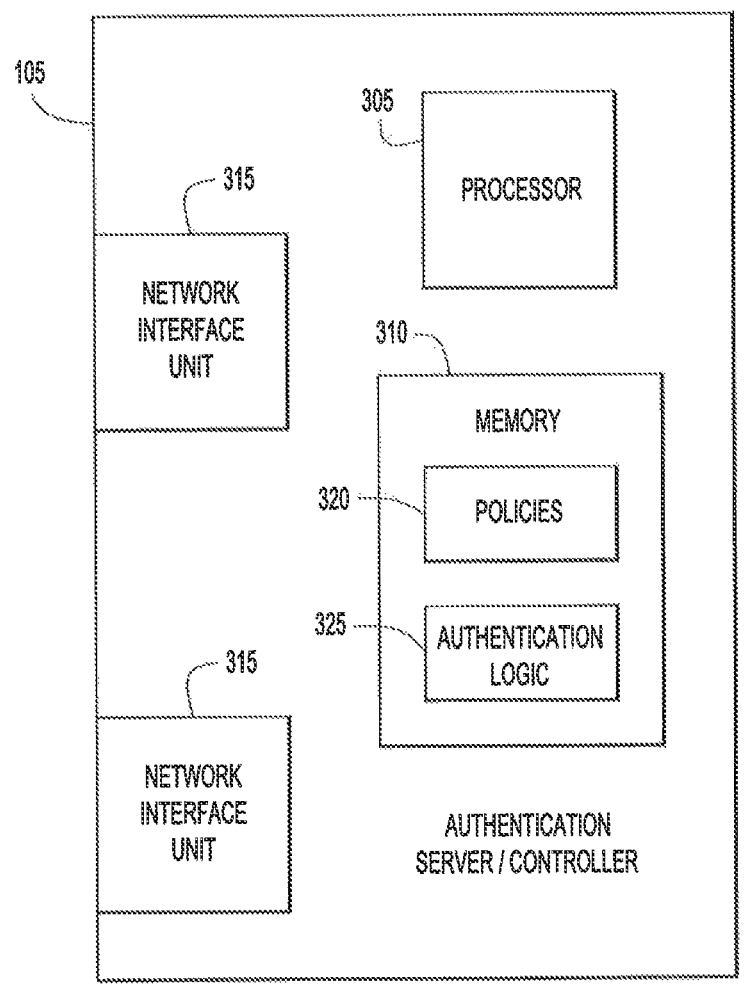
FIG. 3 is a block diagram of an authentication server configured to participate in the network access system, according to an example embodiment.

FIG. 3 is a block diagram illustrating an authentication server/controller 105 in more detail. This diagram is representative of any of the authentication servers shown in FIG. 2.

The authentication server/controller 105 includes one or more processors 305, a memory 310, and one or more network interface devices 315. Processor 305 may be a microprocessor or microcontroller. Memory 310 may include read only memory (ROM), random access memory (RAM), magnetic disk storage media devices, optical storage media devices, flash memory devices, electrical, optical, or other physical/tangible memory storage devices. Processor 305 executes instructions stored in memory 310.

Thus, in general, memory 310 may include one or more tangible (non-transitory) computer readable storage media (e.g., a memory device) encoded with software comprising computer executable instructions and, when the software is executed (by processor 305), it is operable to perform the operations described herein in connection with the generation, adjustment and transmission of the controls used to control network lighting endpoints 120(1)-120(N) and perform the authentication techniques described herein. To this end, memory 310 stores data for one or more authentication policies 320 and instructions for authentication logic 325. Policies 320 may also include a database of users and authentication policies for each user based on their login credentials, etc. Alternatively, policies 320 may be stored in a remote device that the authentication server/controller accesses, as needed.

Figure 4:
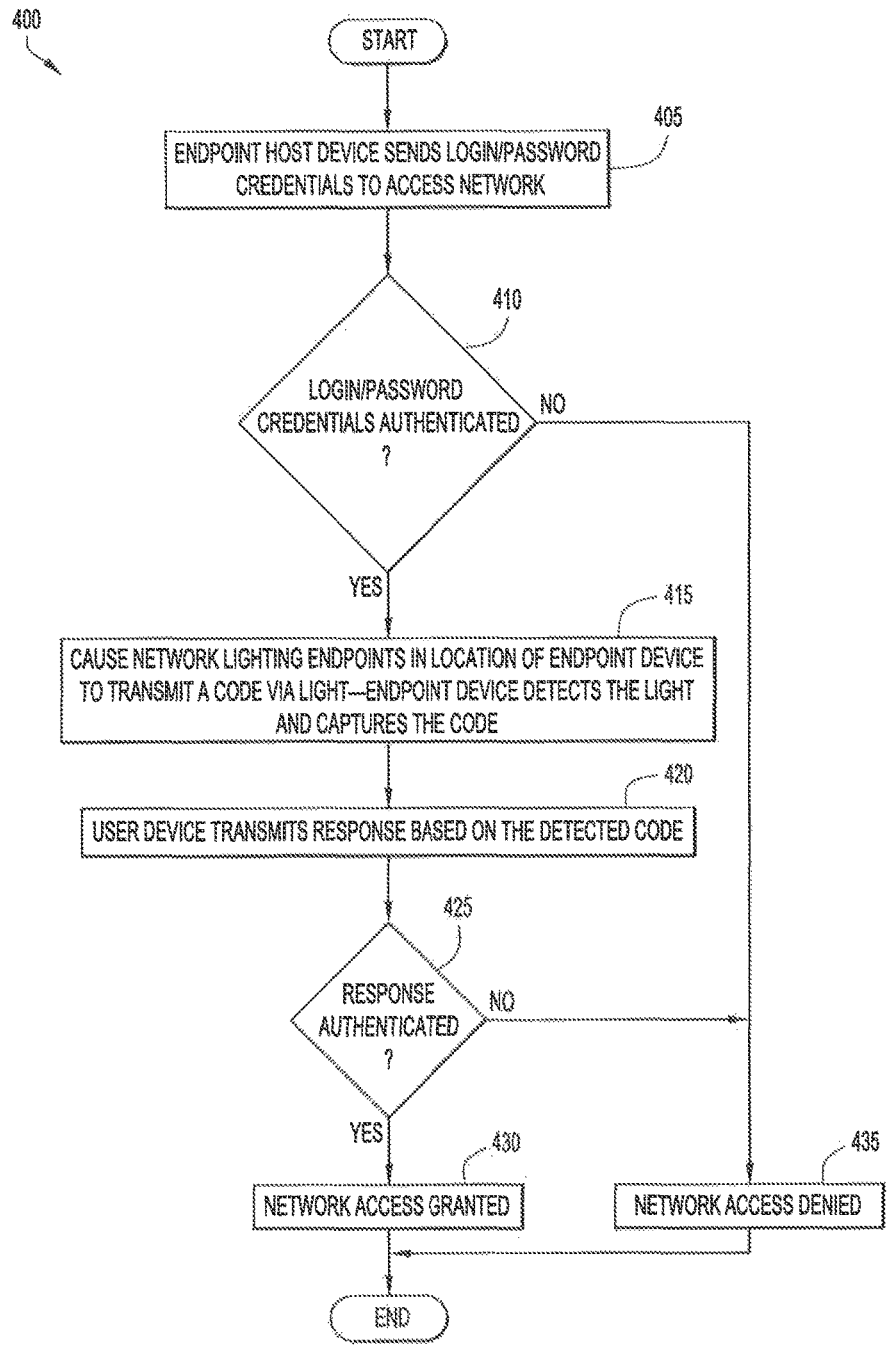
FIG. 4 is a flowchart of an example method of operations performed to use light as part of multi-factor authentication, according to an example embodiment.

With reference to FIG. 4, a high-level flowchart is shown for example operations of a method 400 performed by authentication server/controller 105 to provide multi-factor authentication using light to control access to network resources. Reference may also be made to FIG. 1 in connection with the description of FIG. 4. It is to be understood that the operations shown in FIG. 4 may be performed entirely by the network access device, entirely by the authentication server/controller, or some operations may be performed by the network access device and the authentication server/controller.

At 405, endpoint host device 130 requests access to network resources 101. The access request may include the login/password credentials associated with a user of the endpoint host device 130. Endpoint host device 130 sends the access request with the login/password credentials to network access device 110.

At 410, the received login credentials are evaluated to determine whether they are authenticated. For example, a comparison is made of the received login credentials with data stored in an authorization database or policies database as being associated with an authentic user associated with endpoint host device 130. If the login credentials are authenticated, operation proceeds to step 415, otherwise to 435.

At 415, assuming operation 410 successfully authenticates the login credentials transmitted by endpoint host device 130, a command is sent to one or more network lighting endpoints 120(1)-120(N) to transmit a code in light emitted in the room where the endpoint post device 130 is located. Network lighting endpoints 120(1)-120(N) may use any now known or hereafter developed technique to transmit the code to endpoint host device 130, including, but not limited to, Light Fidelity ("Li-Fi") and Visual Light Communications ("VLC") protocols. Network lighting endpoints 120(1)-120(N) may continuously broadcast a rotating code within secure room 140, wherein controller 105 or network access device 110 causes the transmitted code to be periodically changed, i.e., rotated. Endpoint device 130 may control camera 136 to capture and receive the transmitted code.

At 420, assuming that endpoint host device 130 successfully captured and received the transmitted code in operation 415, endpoint host device 130 generates and transmits to controller 105 or network access device 110 a response that includes information derived from the received code. That is, endpoint host device 130 receives a secure code over light emitted from one or more network lighting endpoints 120(1)-120(N), and then transmits an authentication response to network access device 110 using a desired access communication technology, e.g., wired or wireless (where wireless includes radio frequency wireless and light wireless). That is, the link between the network access device 110 and the endpoint host device 130 may be a light-based wireless link.

At 425, controller 105 authenticates the received response to determine whether it was derived from the transmitted code and from a valid code. That is, a code may be valid for a predetermined period of time. A comparison is made between the received response and an expected response, based on the code that was transmitted in the secure room.

If it is determined that the received response matches the expected response, operation proceeds to 430, otherwise to 435.

At 430, if operation 425 successfully authenticated the response transmitted by endpoint host device 130, endpoint host device 130 is granted access to network resources 101, and the process 400 ends.

At 435, if operation 425 failed to successfully authenticate the response transmitted by endpoint host device 130, access of endpoint host device 130 to the network resources is denied.

Figure 5:
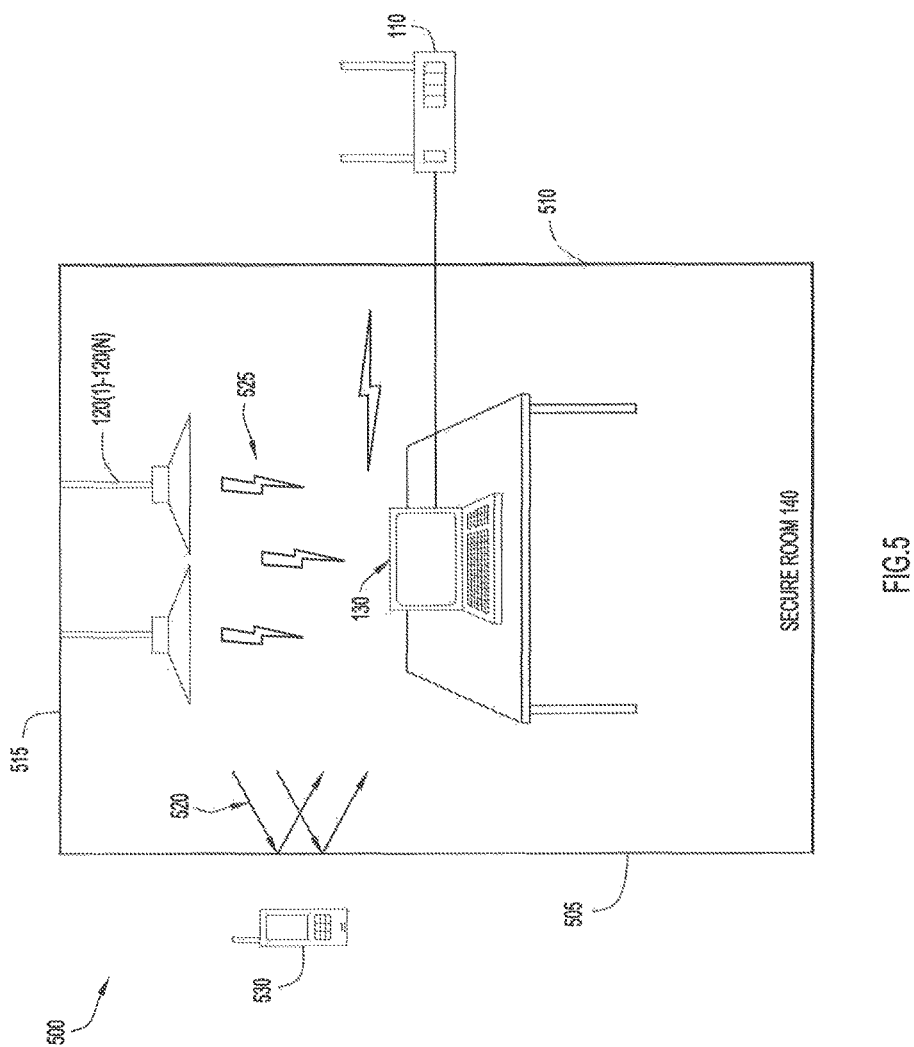
FIG. 5 is an illustration of an access environment in which the multi-factor authentication techniques may be employed, according to an example embodiment.

With reference to FIG. 5, there is depicted a diagram of an access environment 500 in which a multi-factor authentication process is employed to control access to network resources. Access environment 500 includes secure room 140, in which network lighting endpoints 120(1)-120(N) and endpoint host device 130 are physically located. Secure room 140 is defined by walls 505 and 510, and by ceiling 515, from which network lighting endpoints 120(1)-120(N) may be affixed. Access environment further includes network access device 110, and there may be one or more endpoint devices 530 that are located physically outside the walls 505 and 510 defining the boundaries of secure room 140. FIG. 5 shows network access device 110 outside the room 140, but this is not a requirement as it may be located within room 140. To restrict access to network resources, one or more network lighting endpoints 120(1)-120(N) are caused to transmit a code via one or more light waves 520 and 525 in room 140. Host endpoint device 130 is able to receive this light because it is within room 140. The one or more network lighting endpoints 120(1)-120(N) may be controlled to transmit the code after authenticating endpoint host device 130 based on an initial access request, or, optionally, the one or more network lighting endpoints 120(1)-120(N) are caused to continuously transmit the code within room 140. The value of the code may be periodically changed to prevent eavesdropping or other malicious attempts to gain unauthorized access to network resources.

After successfully capturing and receiving the transmitted code, endpoint host device 130 generates a response based on the received code, and transmits the generated response to network access device 110. Conversely, device 530, which, as shown, is physically located outside the boundaries of secure room 140, is not able to receive the transmitted code because light waves 520 do not penetrate walls 505 and 510. Endpoint host device 130, however, is physically located within secure room 140 and therefore is able to receive the code contained in the light emitted by lighting endpoints 120(1)-120(N).

Endpoint host device 130 may use any now known or hereafter developed technique to transmit the generated response to network access device 110, including, by a wired network communication or a wireless network radio frequency ("RF") communication capable of penetrating walls 505 and 510 in the case in which the network access device 110 is a wireless access point. Accordingly, access environment 500 may enable controlled access to network resources 100 to all endpoint devices within secure room 140, while effectively preventing access to devices (e.g., device 530) outside the physical boundaries of secure room 140.

Figure 6:
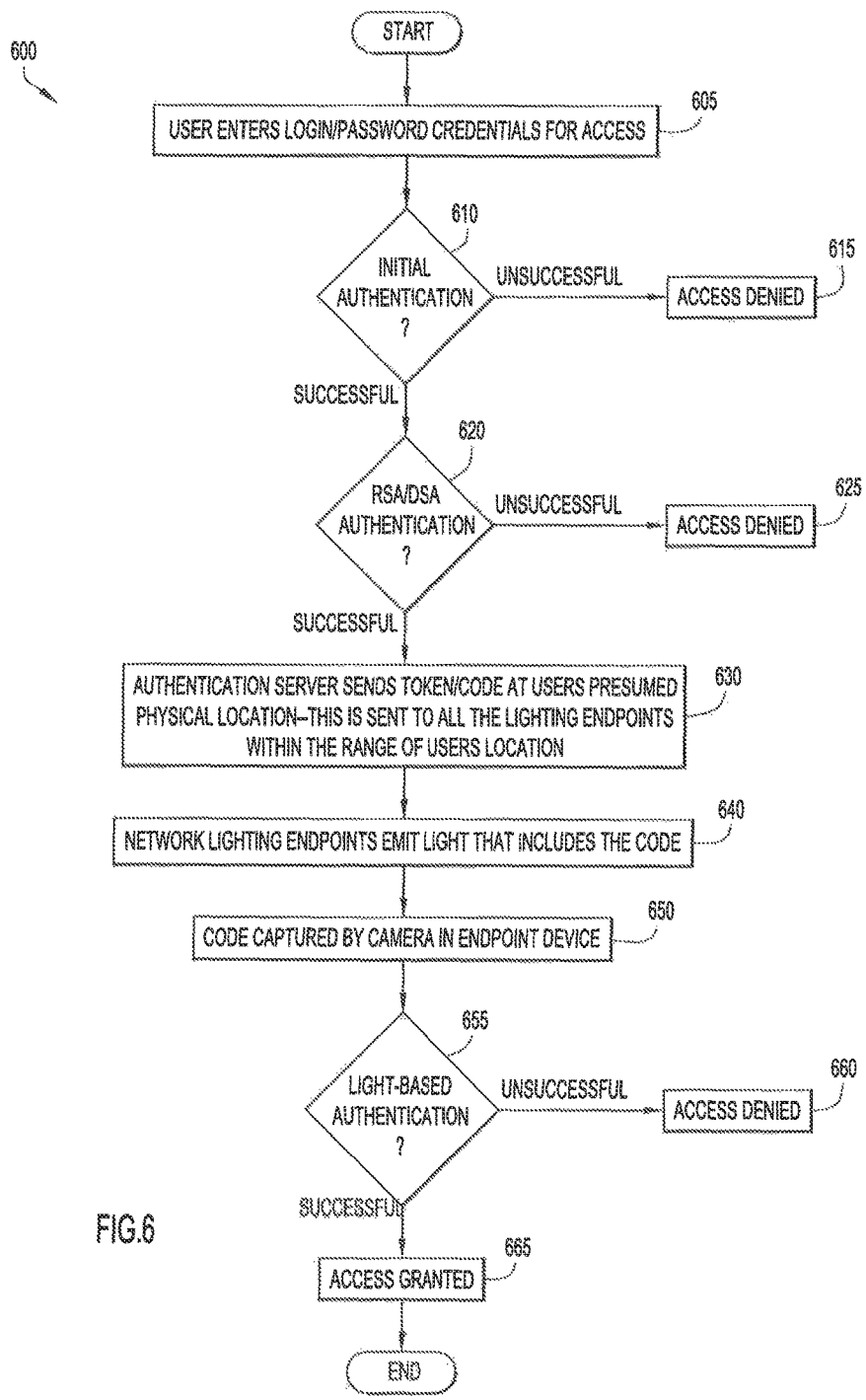
FIG. 6 is a flowchart of an example method of operations performed to use light as part of a multi-factor authentication protocol, according to an example embodiment.

With reference to FIG. 6, there is a more detailed flowchart of a more detailed method 600 for multi-factor authentication using light, according to an example embodiment. Reference is also made to FIGS. 1 and 5 for purposes of this description.

At 605, endpoint host device 130 initially requests access to network resources 101. The initial access request may include the login/password credentials associated with endpoint host device 130. The login/password credentials are transmitted to network access device 110.

At 610, authentication server/controller 105 (or network access device 110) authenticates the received login credentials. These may involve comparing the received login credentials with data stored in a user authorization database as being associated with a validated user of endpoint host device 130. If the initial login credentials are successfully authenticated, flow proceeds to 620, otherwise flow proceeds to 615.

At 615, assuming operation 610 failed to successfully authenticate the response transmitted by endpoint host device 130, endpoint host device 130 is denied access to network resources, and the process 600 ends.

At 620, if operation 610 successfully authenticates the login credentials transmitted by endpoint host device 130, endpoint host device 130 transmits information for a second authentication factor. Optionally, endpoint host device 130 may transmit the second authentication factor contemporaneously with the initial access request. The second authentication factor information may include a quick response ("QR") code or a secure token, such as a Rivest, Shamir, and Adelman ("RSA") token or a Digital Signature Algorithm ("DSA") token, whose value periodically changes over time. To facilitate authentication, the value of the RSA or DSA token generated by endpoint host device 130 may be time-synchronized with a corresponding value independently maintained by authentication server/controller 105. After receiving the second authentication factor from endpoint host device 130, the second authentication factor information is evaluated to authenticate endpoint host device 130. This may involve comparing the received authentication factor information with a value maintained or generated by authentication server/controller 105 or network access device 110. If it is determined that the received authentication factor information matches the value maintained or generated at authentication server/controller 105 or network access device 110, flow proceeds to 630, otherwise flow proceeds to 625.

At 625, if operation 620 failed to successfully authenticate endpoint host device 130, endpoint host device 130 is denied access to network resources, and the process 600 ends.

At 630, if operation 620 successfully authenticates endpoint host device 130, control signals are sent to network lighting endpoints instructing the network lighting endpoints to transmit a code to host device 130 via light emitted by the network lighting endpoints. The control signals are sent, for example, over communication network 103 to network lighting endpoints 120(1)-120(N) affixed in secure room 140, where endpoint host device 130 is determined to be located. Location techniques that rely on wireless signals received by endpoint host device 130 may be used to generally determine the physical location of endpoint host device 130, and that location is used to determine which network lighting endpoints should be controlled to transmit a token/code in emitted light, where endpoint host device 130 is expected to be located.

At 640, network lighting endpoints 120(1)-120(N) transmit a code via light waves that they emit in room 140. Network lighting endpoints 120(1)-120(N) may use any now known or hereafter developed technique to transmit the code to host device 130, including, but not limited to, Li-Fi and Visual Light Communications ("VLC") protocols. An endpoint host device 130 physically within the boundaries of the determined location wherein the code is transmitted via light waves 525 will be capable of receiving the transmitted code.

At 650, a camera 136 of endpoint host device 130 is used to detect the emitted light from which the code is captured. As described herein, any light sensor device capable of detecting and capturing emitted light waves may be used to perform the functions of camera 136. If endpoint host device 130 successfully captures and receives the code emitted in operation 650, endpoint host device 130 generates and transmits a response derived from the received code to network access device 110, which forwards the generated response to authentication server/controller 105. The response may include the code itself, or may include some other information that is uniquely derived from the code.

At 655, authentication server/controller 105 (or network access device 110) authenticates the received response to determine whether it was derived from (e.g., contains) the transmitted code. This may involve comparing the received response with an expected response, which authentication server/controller 105 determines based on the value of the code emitted by lighting endpoints 120(*n*) in room 140. If authentication server/controller 105 determines that the received response matches the expected response, flow proceeds to 665, otherwise flow proceeds to 660.

At 660, if operation 655 failed to successfully authenticate the response transmitted by endpoint host device 130 as being derived from the code, endpoint host device 130 is denied access to network resources, and the process 600 ends.

At 665, if operation 655 successfully authenticated the response transmitted by endpoint host device 130, endpoint host device 130 is granted access to network resources, and the process 600 ends.

Figure 7:
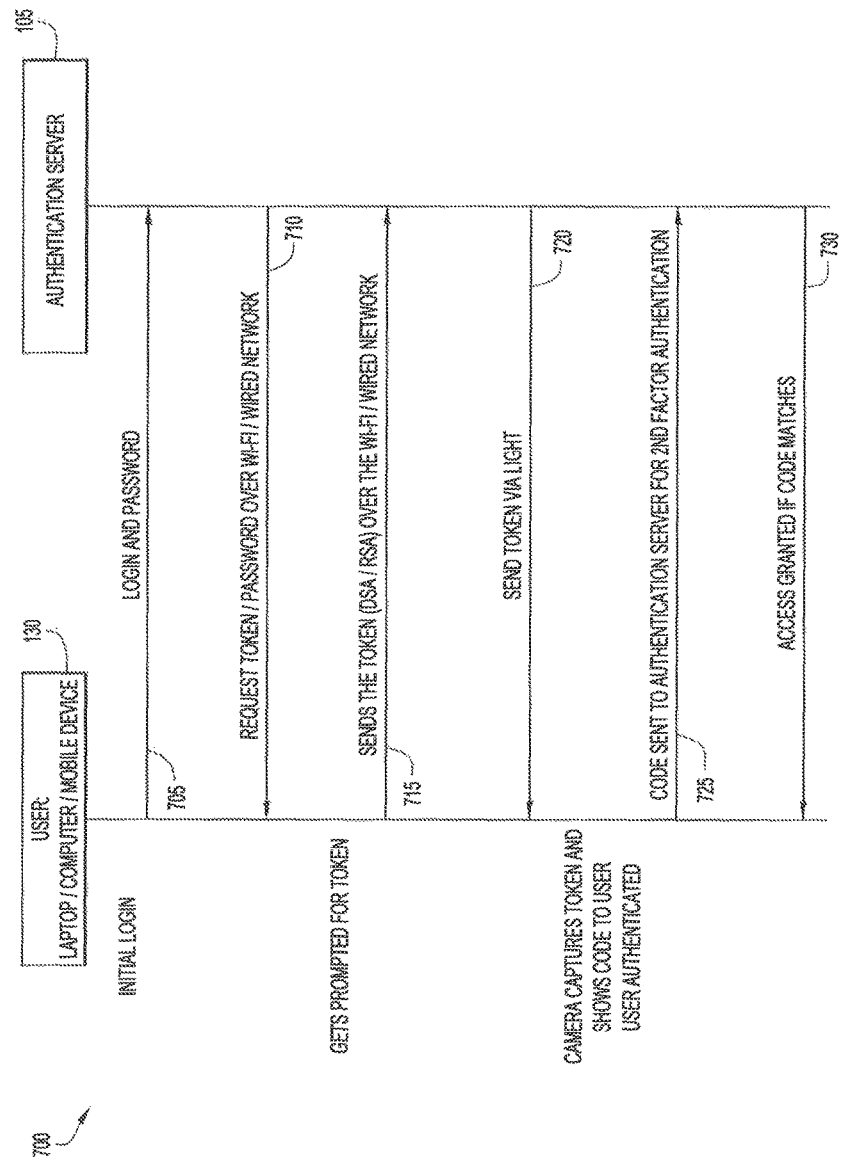
FIG. 7 is an illustration of an example signaling flow to determine whether to grant network access, according to an example embodiment.

With reference to FIG. 7, there is an illustration of communications 700 between entities that are part of the process 600 shown in FIG. 6. Reference is also made to FIG. 1 for purposes of this description. Initially, endpoint host device 130 transmits request 705 to gain access to network resources 103. Access request 705 may include a login and password associated with the user of endpoint host device 130. If authentication server/controller 105 successfully authenticates request 705, at 710 authentication server/controller 105 transmits a command prompting endpoint host device 130 to return the value of a secure token, which may be an RSA or a DSA token, generated at endpoint host device 130. In response to receiving command 710, at 715 endpoint host device 130 transmits a response based on the value of the secure token generated at host device 130. If authentication server/controller 105 successfully authenticates the response as based on the token that it expected to receive, at 720 authentication server/controller 105 causes network lighting endpoints to transmit a token (code) in secure room 140 using light waves 520 and 525. Endpoint host device 130 may control camera 136 to capture and receive the light-emitted token (code), and may display the value of token to the user associated with endpoint host device 130. Because light waves 520 and 525, which are in or near the visible spectrum, are unable to penetrate walls, only those endpoint host devices physically present in a space near network lighting endpoints are able to capture and receive the light-emitted token. At 725, in response to capturing the light-emitted token (code), endpoint host device 130 transmits a response to authentication server/controller 105. This response is derived from the token (code) and therefore indicates that endpoint host device 130 is physically present near network lighting endpoints 120(1)-120(N). Authentication server/controller 105 independently generates an expected response derived from the token (code), and if authentication server/controller 105 is able to authenticate response 725 as being derived from the token, i.e., matching its generated expected response, at 730 authentication server/controller 105 authenticates endpoint host device 130 and transmits a message to endpoint host device 130, or other entities in the network, granting it access to network resources 101. If authentication server/controller 105 does not authenticate response 725, endpoint host device 103 is denied access to network resources 101.

A network access system includes an authentication server, a network access device (wired or wireless), and a networked lighting endpoint that transmits a code over light waves, for example, using a Li-Fi or Visual Light Communication ("VLC") protocol. A device requesting access to the secure network may initially authenticate itself by transmitting identification credentials and associated passwords to the authentication server via the network access device. If the authentication server successfully authenticates the received credentials and associated passwords, one or more lighting endpoints are caused to transmit a code via light in a secure room. If the requesting device successfully receives the transmitted code, it generates a response based on the received code, and transmits the generated response to the authentication server. If the authentication server successfully authenticates the requesting device based on the response, it grants the request for the network access, otherwise it denies the request. Because light waves transmitted from the lighting endpoint do not permeate the walls of the secure room, the requesting device must be physically located in the secure room to successfully receive the transmitted code.

In summary, embodiments described herein involve performing multi-factor authentication using light to control access to network resources. If a host device is initially authenticated, an authentication server/controller causes one or more light fixtures to transmit a code to the host device using light waves that are at, or near, the visible spectrum. Because the light waves are unable to penetrate solid boundaries, e.g., walls, a host device must be proximately located with the light fixtures to successfully capture the transmitted code. This will typically occur when the host device is co-located in the same secure room as are the one or more light fixtures that transmitted the code. After receiving the code, the host device will generate a response that is derived from the received code and transmits the generated response to the authentication server/controller over a communication network. If the generated response matches the response that the authentication server/controller expected to receive, the authentication server/controller authenticates the host device and grants the device privileged access to the requested network resources. If the generated response fails to match the expected response, the authentication server/controller is unable to authenticate the host device and denies access to the requested network resources. Thus, the light is used to confirm presence of the host device at a particular location prior to enabling access of the host device to network resources.

Advantages of the embodiments include providing an additional layer of security to control/restrict access to secure network resources. In certain deployments, such as financial institutions, there is a requirement that access is provided strictly only within a physically demarcated space. This cannot always be enforced. The embodiments presented herein provide an additional factor of authentication that is available only within the physical premises by using network-connected lights as a medium of transmission. For example, even if a third party gains access to an authorized user's login credentials, e.g., by eavesdropping or through social engineering, the third party nonetheless will be unable to gain access to the network resources unless he or she is physically located in a restricted environment because he or she would need to be able to receive a token transmitted over light waves. These embodiments therefore require genuine/authentic users to be within a constrained/protected area (e.g., office floor) before connecting to the network, ensuring a user's physical presence when accessing network resources. This is particularly useful for deployments (e.g., in hospitals) that need to limit radio frequency transmissions, and thus require a mobile authentication scheme without radio frequency emissions.

Thus, in one form, a method is provided comprising: receiving a request from a device requesting access to a network; causing a code to be transmitted in light emitted by one or more light fixtures within a physical space in which access to the network is to be restricted; receiving information from the device requesting access to a network; and determining whether to permit the device access to the network based on the received request and on whether the received information is derived from the code transmitted by the one or more light fixtures indicating that the device is within the physical space.

In another form, an apparatus is provided comprising: a network interface unit that enables network communications; and processor, coupled to the network interface unit, and configured to: receive a request from a device requesting access to a network; cause a code to be transmitted in light emitted by one or more light fixtures within a physical space in which access to the network is to be restricted; receive information from the device requesting access to a network; and determine whether to permit the device access to the network based on the received request and on whether the received information is derived from the code transmitted by the one or more light fixtures indicating that the device is within the physical space.

In yet another form, a non-transitory processor readable medium storing instructions that, when executed by a processor, cause the processor to: receive a request from a device requesting access to a network; cause a code to be transmitted in light emitted by one or more light fixtures within a physical space in which access to the network is to be restricted; receive information from the device requesting access to a network; and determine whether to permit the device access to the network based on the received request and on whether the received information is derived from the code transmitted by the one or more light fixtures indicating that the device is within the physical space.

In yet another form, a system is provided comprising: a network including a plurality of network resources; a network access device connected to the network; one or more light fixtures configured to include a code over light emitted within the physical space; a device comprising a light sensor device, wherein the device is configured to: transmit an access request to the network access device; using the light sensor device, capture detected light emitted by the one or more light fixtures and obtain the code; generate information based on the code; and transmit the information to the network access device; the network access device configured to receive the access request and information from the device; and an authentication controller in communication with the network access device, wherein the authentication controller is configured to determine whether to permit the device access to the network based on the received request and on whether the received information is derived from the code transmitted by the one or more light fixtures indicating that the device is within a physical space in which access to the network is to be restricted.

In still another form, an apparatus is provided comprising: a network interface device configured to enable network communications; a light sensor; a processor coupled to the network interface device and to the light sensor, wherein the processor is configured to: generate a network access request for transmission to an authentication controller via a network access device; obtain a code contained in light waves detected by the light sensor; generate information based on the code; transmit the information to the authentication controller via the network access device to enable the authentication controller to determine whether to permit the apparatus access to the network based on the received request and on whether the received information is derived from the code transmitted by the one or more light fixtures indicating that the apparatus is within a physical space.

The above description is intended by way of example only. Various modifications and structural changes may be made therein without departing from the scope of the concepts described herein and within the scope and range of equivalents of the claims.

What is claimed is:

1. A method comprising:
receiving an initial request from a device requesting access to a network, wherein access to the network is restricted only to devices physically located within a secure room;
determining a physical location of the device based on wireless signals received by the device;
determining which one or more network lighting endpoints of a plurality of network lighting endpoints, each having an associated light fixture, is to be controlled to transmit a code in light, based on the physical location of the device;
evaluating the initial request from the device to determine if the device is authenticated for access to the network;
upon determining that the device is authenticated for access to the network, causing the code to be transmitted in light emitted by one or more light fixtures associated with the one or more network lighting endpoints within the secure room;
receiving information from the device requesting access to the network; and
determining whether to permit the device access to the network based on authenticating the received initial request and based on whether the information received from the device is derived the from the code transmitted by the one or more light fixtures indicates that the device is physically located within the same secure room as the one or more light fixtures.

2. The method of claim 1, wherein the determining based on whether the received information is derived from the code transmitted by the one or more light fixtures further comprises comparing the received information with a value generated based at least on the code.

3. The method of claim 1, wherein the initial request includes at least a login identifier and an associated password.

4. The method of claim 3, wherein the initial request further includes an encrypted token.

5. The method of claim 3, wherein the determining whether to permit the device access to the network is further based on multi-factor authentication that includes a first authentication based on the login identifier and the associated password, and a second authentication based on whether the information received from the device is determined to be derived from the code transmitted by the one or more light fixtures.

6. The method of claim 5, wherein the determining whether to permit the device access to the network further comprises determining, as part of the second authentication, whether the information received from the device contains the code transmitted by the one or more light fixtures.

7. The method of claim 3, wherein evaluating the initial request from the device to determine if the device is authenticated for access to the network comprises comparing the login identifier and the associated password received from the device with data stored in a user authorization database to determine that the device is associated with a validated user.

8. The method of claim 1, further comprising generating the code based at least on the initial request.

9. The method of claim 1, further comprising periodically changing the code transmitted by the one or more light fixtures.

10. The method of claim 1, further comprising the one or more light fixtures continuously transmitting the code.

11. The method of claim 1, wherein the initial request to access the network is wirelessly transmitted by the device.

12. The method of claim 1, wherein the code is transmitted by the one or more light fixtures using a Light Fidelity ("Li-Fi") protocol.

13. The method of claim 1, wherein the code is transmitted by the one or more light fixtures using a Visual Light Communication ("VLC") protocol.

14. An apparatus comprising:
a network interface unit that enables network communications;
a processor, coupled to the network interface unit, and configured to:
receive an initial request from a device requesting access to a network, wherein access to the network is restricted only to devices physically located within a secure room;
determine a physical location of the device based on wireless signals received by the device;
determine which one or more network lighting endpoints of a plurality of network lighting endpoints, each having an associated light fixture, is to be controlled to transmit a code in light, based on the physical location of the device;
evaluate the initial request from the device to determine if the device is authenticated for access to the network;
upon determining that the device is authenticated for access to the network, cause the code to be transmitted in light emitted by one or more light fixtures associated with the one or more network lighting endpoints within the secure room;
receive information from the device requesting access to the network; and
determine whether to permit the device access to the network based on authenticating the received initial request and based on whether the information received from the device is derived from the code transmitted by the one or more light fixtures indicates that the device is physically located within the same secure room as the one or more light fixtures.

15. The apparatus of claim 14, wherein the processor is configured to determine whether the information is derived from the code transmitted by the one or more light fixtures by comparing the information with a value generated based at least on the code.

16. The apparatus of claim 14, wherein the processor is configured to determine whether to permit the device access to the network is further based on multi-factor authentication that includes a first authentication based on a login identifier and an associated password, and a second authentication based on whether the information received from the device is determined to be derived from the code transmitted by the one or more light fixtures.

17. A non-transitory processor readable medium storing instructions that, when executed by a processor, cause the processor to:
receive an initial request from a device requesting access to a network, wherein access to the network is restricted only to devices physically located within a secure room;
determine a physical location of the device based on wireless signals received by the device;
determine which one or more network lighting endpoints of a plurality of network lighting endpoints, each having an associated light fixture, is to be controlled to transmit a code in light, based on the physical location of the device;
evaluate the initial request from the device to determine if the device is authenticated for access to the network;
upon determining that the device is authenticated for access to the network, cause the code to be transmitted in light emitted by one or more light fixtures associated with the one or more network lighting endpoints within the secure room;
receive information from the device requesting access to the network; and
determine whether to permit the device access to the network based on authenticating the received initial request and based on whether the information received from the device is derived from the code transmitted by the one or more light fixtures indicates that the device is physically located within the same secure room as the one or more light fixtures.

18. The non-transitory processor readable medium of claim 17, wherein the instructions operable to determine whether the information is derived from the code transmitted by the one or more light fixtures further comprise instructions operable for comparing the received information with a value generated based at least on the code.

19. The non-transitory processor readable medium of claim 17, wherein the initial request includes at least a login identifier and an associated password.

20. The non-transitory processor readable medium of claim 19, wherein the instructions operable to determine whether to permit the device access to the network is further based on two-factor authentication that includes a first authentication based on the login identifier and the associated password, and a second authentication based on whether the information is determined to be derived from the code transmitted by the one or more light fixtures.

* * * * *

UNITED STATES PATENT AND TRADEMARK OFFICE
CERTIFICATE OF CORRECTION

PATENT NO. : 10,397,777 B2
APPLICATION NO. : 15/142061
DATED : August 27, 2019
INVENTOR(S) : Ashwin Kumar et al.

It is certified that error appears in the above-identified patent and that said Letters Patent is hereby corrected as shown below:

In the Claims

Claim 1, Column 10, Line 49, please replace "derived the from" with --derived from--

Signed and Sealed this
Fifth Day of November, 2019

Andrei Iancu
*Director of the United States Patent and Trademark Office*